US008819766B2

(12) United States Patent
Kandasamy et al.

(10) Patent No.: US 8,819,766 B2
(45) Date of Patent: Aug. 26, 2014

(54) DOMAIN-BASED ISOLATION AND ACCESS CONTROL ON DYNAMIC OBJECTS

(75) Inventors: Madhusudanan Kandasamy, TamilNadu (IN); Ranganathan Vidya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 12/964,765

(22) Filed: Dec. 10, 2010

(65) Prior Publication Data

US 2012/0151552 A1 Jun. 14, 2012

(51) Int. Cl.
  *G06F 21/00* (2013.01)
(52) U.S. Cl.
  USPC ............ 726/1; 726/2; 726/4; 726/5; 713/168; 713/169; 713/170
(58) Field of Classification Search
  USPC ............................ 726/1, 2, 4, 5; 713/168–170
  See application file for complete search history.

(56) References Cited

U.S. PATENT DOCUMENTS

| 5,664,098 A * | 9/1997 | Bianchi et al. ................... 726/16 |
| 2006/0010483 A1 | 1/2006 | Buehler et al. |
| 2007/0220276 A1* | 9/2007 | Croxford et al. .............. 713/193 |
| 2009/0113425 A1* | 4/2009 | Ports et al. ........................ 718/1 |

OTHER PUBLICATIONS

Bhatti et al., 'Access Control in Dynamic XML-based Web-Services with X-RBAC'; accepted for publication in International Conference on Web Services, Las Vegas, Jun. 2003.

\* cited by examiner

*Primary Examiner* — Aravind Moorthy
*Assistant Examiner* — Peiliang Pan
(74) *Attorney, Agent, or Firm* — Yudell Isidore Ng Russell PLLC

(57) ABSTRACT

A technique for performing domain-based access control for granular isolation on a data processing system includes assigning, using the data processing system, one or more first domain tags to a dynamic object that is created by a first process that is executing on the data processing system. The technique also includes assigning, using the data processing system, one or more second domain tags to a second process that is executing on the data processing system. The first and second domain tags are evaluated, using the data processing system, according to one or more enforced rules to determine whether to grant or deny the second process access to data associated with the dynamic object.

11 Claims, 4 Drawing Sheets

| User ID (UID) | Group ID (GID) | Domain ID (DID) |
|---|---|---|
| User1 | Science | Physics, Chemistry |
| User2 | Science | Computers |
| User3 | Science | Biology |
| User4 | Science | Physics, Chemistry, Computers, Bioloby |

| User ID (UID) | Group ID (GID) | Domain ID (DID) |
|---|---|---|
| User1 | Science | Physics, Chemistry |
| User2 | Science | Physics, Computers |
| User3 | Science | Physics, Biology |
| User4 | Science | Chemistry, Computers, Biology |

FIG. 3

DOMAIN-BASED ISOLATION AND ACCESS CONTROL ON DYNAMIC OBJECTS

BACKGROUND

1. Technical Field

The present invention generally relates to dynamic objects and in particular to techniques for domain-based isolation and access control on dynamic objects.

2. Description of the Related Art

In computer system security, mandatory access control (MAC) refers to a type of access control in which an operating system (OS) constrains the ability of a subject (or initiator) to access or generally perform some operation on an object (or target). MAC is a system-enforced approach for restricting access to objects based on a sensitivity of an object and a clearance of a user. In practice, a subject is usually a process or thread and an object is usually a construct, e.g., a file, a file system, a volume group, a network port, or a network interface. In a usual case, subjects and objects each have a set of security attributes. In this manner, when a subject attempts to access an object, an authorization rule set enforced by an OS kernel examines the security attributes and decides whether the access can take place. Under MAC, any operation by any subject on any object is tested against an authorization rule set (or security policy) to determine if the operation is allowed. Historically, MAC has been closely associated with multi-level secure (MLS) systems.

MAC enabled systems allow policy administrators to implement organization-wide security policies. For MAC, an access control decision is contingent on verifying compatibility of data security properties and individual clearance properties (or process clearance properties for a process that functions as a proxy for an individual). The access control decision depends on the integrity of the metadata that defines the security properties of the data, as well as the security clearance of the individual or process requesting access to the data. For example, if a security label can be changed by a user, then the user can corrupt the access controls. In general, security mechanisms that protect metadata and access control decision logic from corruption are MAC critical objects that require robustness.

In computer system security, discretionary access control (DAC) typically means restricting access to objects based on an identity of subjects and/or groups to which the objects belong. DAC controls are discretionary in the sense that a subject with a certain access permission is capable of passing that permission (e.g., indirectly) on to another subject (unless restrained by a MAC). Systems may implement both MAC and DAC simultaneously. In this case, DAC refers to a first category of access controls that subjects can transfer among each other and MAC refers to a second category of access controls that imposes constraints upon the first category of access controls. The traditional UNIX operating system of users, groups, and read-write-execute permissions is an example of DAC.

In computer system security, role-based access control (RBAC) is another approach that may be employed to restrict system access to authorized users for administrative functions and tasks. Within an organization, roles are created for various job functions and permissions to perform certain operations are assigned to specific roles. System users are assigned particular roles and through role assignments acquire permissions to perform particular system functions. Since users are not assigned permissions directly, but only acquire the permissions through their assigned role (or roles), management of individual user rights becomes a matter of assigning appropriate roles to users. In general, the implementation of RBAC simplifies common system operations, e.g., adding a user to a system or changing a department of an existing system user.

A typical RBAC implementation employs role assignments, role authorizations, and transaction authorizations. Role assignments dictate that a subject can execute a transaction only if the subject has been assigned a role that permits execution of the transaction. Role authorization dictates that an active role for a subject must be authorized for the subject. Role authorization ensures that users can only take on roles for which they are authorized. Transaction authorization dictates a subject can execute a transaction only if the transaction is authorized for the active role of the subject. In general, roles can be combined in a hierarchy where higher level roles subsume permissions owned by sub-roles.

RBAC differs from an access control list (ACL) used in traditional DAC systems in that RBAC assigns permissions to specific operations with meaning in an organization, as contrasted with assigning permissions to low level data objects. For example, an ACL could be used to grant or deny write access to a particular system file, but the ACL would not dictate how the system file could be changed. In an RBAC system, the assignment of a permission to perform a particular operation is meaningful, as operations are granular with meaning within an application. RBAC has been shown to be particularly well suited to separation of duties (SoD) requirements, which ensure that two or more people are involved in authorizing critical operations.

BRIEF SUMMARY

Disclosed are a method, a data processing system, and a computer program product (embodied in a computer-readable storage medium) for employing domain-based access control for granular isolation on dynamic objects.

A technique for performing domain-based access control on a data processing system includes assigning, using the data processing system, one or more first domain tags to a dynamic object that is created by a first process that is executing on the data processing system. The technique also includes assigning, using the data processing system, one or more second domain tags to a second process that is executing on the data processing system. The first and second domain tags (i.e., the domain tag(s) of the dynamic object and the domain tag(s) of the second process that is attempting to access data associated with the dynamic object) are evaluated, using the data processing system, according to one or more enforced rules to determine whether to grant or deny the second process access to data associated with the dynamic object.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 2 is a table that provides exemplary domain tag distributions and assignments for users according to one embodiment of the present disclosure;

FIG. 3 is another table that provides exemplary domain tag distributions and assignments for users according to another embodiment of the present disclosure.

DETAILED DESCRIPTION

The illustrative embodiments provide a method, a data processing system, and a computer program product (embodied in a computer-readable storage medium) for employing domain-based access control and granular isolation on dynamic objects.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Role-based access control (RBAC) allows for the creation of roles for system administration and the delegation of administrative tasks across a set of trusted system users. RBAC provides a mechanism through which administrative functions (typically reserved for a root user) can be assigned to regular system users. RBAC assigns administrative functions to users by defining job functions (roles) within an organization and assigning those roles to specific users. Assigning a role to a user effectively confers a set of permissions or privileges and powers to the user. For example, one management role may pertain to managing file systems, while another management role may pertain to enabling creation of user accounts.

Figure 1:
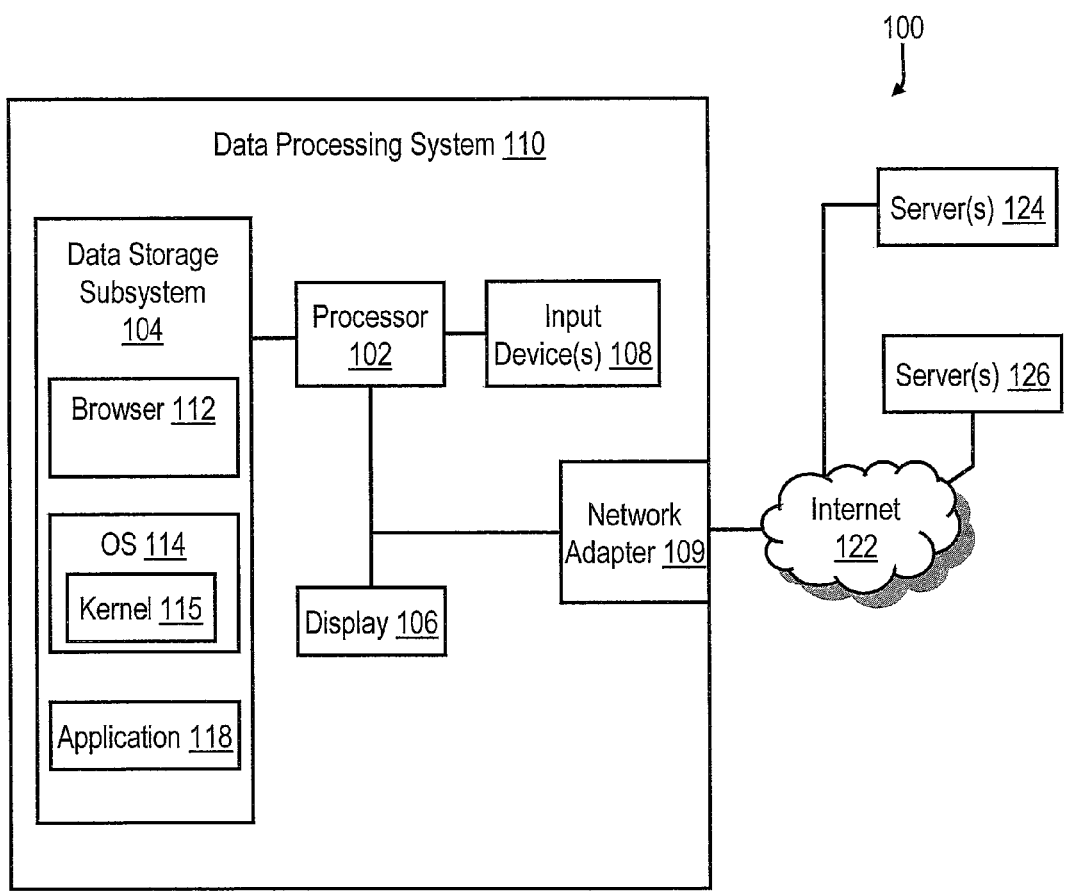
FIG. 1 is a diagram of a relevant portion of an exemplary data processing environment with a data processing system that implements domains for access control and granular isolation of dynamic objects in accordance with various embodiments of the present disclosure.

With reference to FIG. 1, an exemplary data processing environment 100 is illustrated that includes a data processing system 110 that is configured to employ domain tags on dynamic objects according to one or more embodiments of the present disclosure. Data processing system 110 may take various forms, such as servers, workstations, laptop computer systems, notebook computer systems, or desktop computer systems and/or clusters thereof. Data processing system 110 includes a processor 102 (which may include one or more processor cores for executing program code) coupled to a data storage subsystem 104, a display 106, one or more input devices 108, and a network adapter 109.

Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives. Data storage subsystem 104 includes an operating system (OS) 114 for data processing system 110. As is illustrated, OS 114 includes an OS kernel 115 that is configured to evaluate domain tags of processes and dynamic objects according to one or more enforced rules to determine whether to grant or deny the processes access to data associated with the dynamic objects. Data storage subsystem 104 also includes application programs, such as a browser 112 (which may optionally include customized plug-ins to support various client applications), and other applications (e.g., a word processing application, a presentation application, and an email application) 118.

As is well known, a browser (or web browser) is a software application that allows a user (at a client) to display and interact with text, images, and other information located on a web page at a website (hosted by an application server) on the World Wide Web or a local area network. Text and images on a web page may contain hyperlinks to other web pages at the same or different website. Browsers allow a user to quickly and easily access information provided on web pages at various websites by traversing hyperlinks. A number of different browsers, e.g., Internet Explorer™, Mozilla Firefox™, Safari™, Opera™, and Netscape™, are currently available for personal computers. In general, browsers are the most commonly used type of hypertext transfer protocol (HTTP) user agent. While browsers are typically used to access web application servers (hereinafter "web servers") that are part of the World Wide Web, browsers can also be used to access information provided by web servers in private networks or content in file systems.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

According to various aspects of the present disclosure, access control on resources of a data processing system are managed through implementation of a domain-aware framework in an OS kernel (e.g., a domain-aware RBAC framework in an UNIX kernel). As should be appreciated, static resources of conventional data processing systems can take various forms, e.g., files, file systems, volume groups, network ports, and network interfaces. In conventional data processing systems, existing access control mechanisms on dynamic objects (i.e., objects that do not exist after OS kernel reboot) have only employed DAC. However, as demands increase for higher isolation levels and security requirements for data processing systems, it is increasingly desirable to secure dynamic objects of data processing systems at a higher level.

In various data processing systems, it is desirable that applications share resources for exchange of data or communication between the applications. However, when only DAC is implemented for access control on dynamic objects, a security breach may occur when an unauthorized process attempts to access data associated with a dynamic object. To address this problem, according to the present disclosure, a domain-based access control framework is implemented for objects that are dynamically created during process execution.

A domain-based access control framework can be implemented in an operating system (OS) to increase the granularity of isolation for dynamic objects. For example, a domain can be defined to represent different entities (e.g., different departments or different work groups). A domain is essentially a tag that can be associated with a user and dynamic objects created by a process executed by the user. In one or more embodiments, user identifiers/credentials are associated with an appropriate domain or domains. For example, a system administrator can configure users as members of particular domains. In this manner, a subject inherits domains propagated by a process invoking user. In general, an OS can support access to objects for different departments of an organization and for different purposes. For example, domain tags can be department names, divisions, or work groups and can be applied to dynamic objects in conventional computer systems. In one or more embodiments, domain-based access control is applied in a role based access control (RBAC) enabled system for leveraging privileged applications and facilitating granular level management of secure dynamic objects.

In this manner, domain support may be implemented for services that manipulate dynamic objects. For example, dynamically created objects may correspond to inter-process communications (IPCs), such as semaphores, message queues, and shared memory, a temporary file, or a directory. In general, dynamic objects are created by a process that is owned by a user (or owner). According to conventional approaches, if a process that did not create an IPC tries to access the IPC, the process is allowed to access the IPC based on permissions associated with the IPC or based on an access control list (ACL). Advantageously, adding domain tags to dynamic objects according to the present disclosure allows users (e.g., in a given role) to communicate or exchange data across objects of the same domain while maintaining a desired security at granular levels.

For example, with reference to FIG. 2, a table 200 is illustrated that includes four exemplary users (i.e., User1, User2, User3, and User4) that belong to a 'science' group. The users in the 'science' group can create persistent shared data on any domain (in this example the domains with the science group include: physics, chemistry, computers, and biology domains) within the 'science' group and access to the persistent shared data can be administered to facilitate access control for processes in the same group, with a given permission (e.g., rwxrwxrwxrwx) that is based on domain property enforcements. In this case, the permission 'r' corresponds to read, the permission 'w' corresponds to write, and the permission 'x' corresponds to execute.

In the example of FIG. 2, User4 can access data created by processes within the 'science' group owned by User1, User2, and User3, as User4 includes all domains (i.e., physics, chemistry, computers, and biology) of User1, User2, and User3. However, User1 cannot access data created by processes within the 'science' group owned by User2 or User3, as User1 does not share a domain in the 'science' group with User2 or User3. User1 may be able to access data created by processes within the 'science' group owned by User4, depending on one or more enforced rules (as User1 shares the physics and chemistry domains with User4).

Similarly, User2 cannot access data created by a process within the 'science' group owned by User1 or User3, as User2 does not share a domain in the 'science' group with User1 or User3. User2 may be able to access data created by a process within the 'science' group owned by User4, depending on one or more enforced rules (as User2 shares the computers domain with User4). Likewise, User3 cannot access data created by a process owned by User1 or User2, as User3 does not share a domain in the 'science' group with User1 or User2. User3 may be able to access data created by a process within the 'science' group owned by User4, depending on one or more enforced rules (as User3 shares the biology domain with User4).

With reference to FIG. 3, a table 300 is illustrated that includes users (i.e., User1, User2, User3, and User4) that also belong to a 'science' group. As above, the users in the 'science' group can create persistent shared data on any domain (in this example the domains include: physics, chemistry, computers, and biology domains) within the 'science' group and access to the persistent shared data can be administered to facilitate access control for processes in the same group, with a given permission (e.g., rwxrwxrwxrwx) that is based on domain property enforcements. As above, the permission 'r' corresponds to read, the permission 'w' corresponds to write, and the permission 'x' corresponds to execute.

In the example of FIG. 3, User4 can access, depending on one or more enforced rules, certain data created by processes within the 'science' group owned by User1, User2, and User3, as User4 includes common domains (i.e., chemistry, computers, and biology, respectively) with User1, User2, and User3. User1 can access, depending on one or more enforced rules, data created by processes within the 'science' group owned by User2, User3, and User4, as User1 shares a domain in the 'science' group with User2 (i.e., the physics domain), User3 (i.e., the physics domain), and User4 (i.e., the chemistry domain). Similarly, User2 can access, depending on one or more enforced rules, certain data created by processes within the 'science' group owned by User1, User3, and User4, as User2 shares a domain in the 'science' group with User1 (i.e., the physics domain), User3 (i.e., the physics domain), and User4 (i.e., the computers domain). Likewise, User3 can access, depending on one or more enforced rules, certain data created by processes owned by User1, User2, and User4, as User3 shares a domain in the 'science' group with User1 (i.e., the physics domain), User2 (i.e., the physics domain), and User4 (i.e., the biology domain).

According to the present disclosure, domains of a user running a privileged application (e.g., with an assigned role) are incorporated into a process credential. In this case, when a process creates a dynamic object, domain tags of the creating process are tagged to the dynamic object. In the event that a different process attempts to access data from the dynamic object, the different process may be granted access based on various enforced rules. For example, an Alpha (All) rule, a Star (Any) rule, and/or a Conflict (Deny) rule enforced on a dynamic object may be utilized to determine whether a process is granted access to data associated with the dynamic object. For example, rules on a dynamic object may be applied by a creating process. As used herein, the Alpha rule specifies that a domain set of a dynamic object is required to be a subset of a domain set of a requesting process. The Star rule, as used herein, specifies that the domain set of a dynamic object is required to share one or more common domain with a domain set of a requesting process. As used herein, the Conflict rule specifies a denial domain set that takes precedence over the Alpha and Star rules when a domain set of a requesting process does not include any of the domains in the denial domain set.

In one or more disclosed embodiments, when the disclosed techniques are implemented within a UNIX system, inter-process communication (IPC) kernel services and subroutines (e.g., semget( ) semctl( ) semop( ) shmget( ) shmctl( ) and shmat( )) are modified to be domain-aware by adding a domain identifier to the subroutines. As is known, the semget( )subroutine gets a set of semaphores and the semctl( )subroutine controls semaphore operations. As is also known, the semop( ) subroutine performs semaphore operations and the shmget( ) subroutine gets shared memory segments. As is further known, the shmctl( )subroutine controls shared memory operations and the shmat( ) subroutine attaches a shared memory segment or a mapped file to a process.

In various embodiments, a domain of a dynamic object creator (user) may be identified in UNIX by implementing a new system call, while passing a process identifier (PID) of the dynamic object creator. If the process that created the dynamic object exists, a system call returns the domains of the dynamic object from the credentials of the running process. If the process that created the dynamic object does not exist, a system call returns an error. In a typical situation, the PID of the dynamic object creator can be obtained from an internal kernel data structure of the dynamic object. In the event that a PID of a dynamic object creator is not already present in an internal kernel data structure of a dynamic object, the PID of the dynamic object creator may be added to the internal kernel data structure of the dynamic object.

Alternatively, an internal kernel data structure of a dynamic object may be provided with an entry for domain identifiers that can be used by a requesting process for access control. In this alternate embodiment, when a requesting process attempts to communicate with a dynamic object, a security check is initiated in a respective service to determine whether the requesting process belongs to the same domain as the creator of the dynamic object (based on governing rules for the domain). In this case, the service fails when the requesting process is not part of the domain of the creator of the dynamic object. In this manner, dynamic object access control is provided for processes that belong to the same domain, in addition to ACL and permission checks via conventional approaches.

Figure 4:
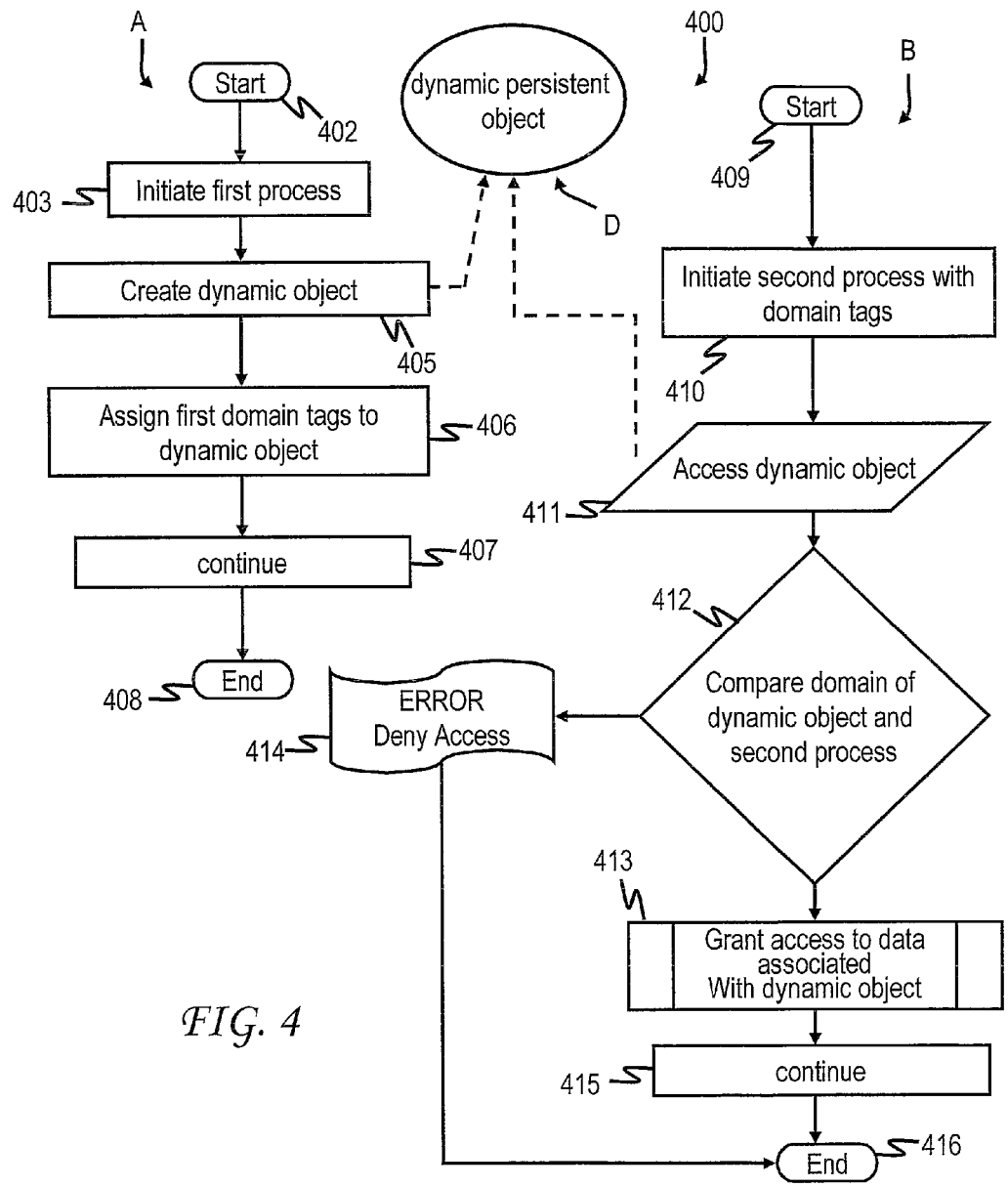
FIG. 4 is a flow chart for an exemplary process that implements domain-based access control for dynamic objects according to various embodiments of the present disclosure.

With reference to FIG. 4, a flow chart for an exemplary domain-based access control process 400 (for employing domain tags on dynamic objects according to various embodiments of the present disclosure) is illustrated. Process 400 includes two processes, i.e., a first process (labeled process 'A') and a second process (labeled process 13'). The first process begins (e.g., in response to selection of an icon associated with a first application by a user) at block 402, at which point control transfers to block 403. In block 403, the first process initiates execution. Next, in block 405, a dynamic object 'D' (e.g., an IPC) is created by the first process.

Then, in block 406, an OS kernel assigns one or more first domain tags to dynamic object 'D'. For example, with reference to FIG. 2, a process created by User1 may be assigned a physics domain tag and a chemistry domain tag by kernel 115. The first process continues with a next instruction in the first application at block 407. While the first process continues execution in block 407, a second process may begin (e.g., in response to selection of an icon associated with a second application by a user) in block 409. Alternatively, in block 408, the first process may end before the second process initiates (or while the second process is executing) and leave dynamic object 'D' on the system. In either case, in block 410, the second process initiates execution and the OS kernel assigns second domain tags to the second process. The second domain tags assigned to second process are utilized by the OS kernel to determine whether data associated with dynamic object 'D' can be accessed by the second process.

In block 411, the second process attempts to access data associated with dynamic object 'D', which was created by the first process. Next, in decision block 412, the OS kernel evaluates the domain tags of dynamic object 'D' and the second process (according to one or more enforced rules) and determines whether to grant to or deny the second process access to data associated with dynamic object 'D'. In response to a decision is to grant the second process access to data associated with dynamic object 'D', control passes from block 412 to block 413. In block 413, the OS kernel grants the second process access to data associated with dynamic object 'D'. In response to a decision is to deny the second process access to data associated with dynamic object 'D', control passes from block 412 to block 414, where an error is indicated. Following block 414, control passes to block 416 where the second process terminates. Following block 413, control transfers to block 415 where the second process continues with a next instruction of the second application. Next, in block 416, the second process terminates upon completion.

In the above embodiment, grant of access to data associated with a dynamic object is allowed following positive domain tag verification. In addition, the disclosed domain-based approach may be implemented in conjunction with permission and ACL checks. For example, assuming that second process was created by User4 (see FIG. 2), the second process is granted access to data associated with dynamic object 'D' as User4 includes all domains of User1.

In the flow chart above, the method depicted in FIG. 4 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of performing domain-based access control for granular isolation on a data processing system, comprising:
    assigning, using the data processing system, one or more first domain tags to a dynamic object that is created by a first process that is executing on the data processing system;
    assigning, using the data processing system, one or more second domain tags to a second process that is executing on the data processing system; and
    evaluating, using the data processing system, the first and second domain tags according to one or more enforced rules to determine whether to grant or deny the second process access to data associated with the dynamic object, wherein the one or more enforced rules include a first rule that specifies that a domain set of the dynamic object is required to be a subset of a domain set of the second process, a second rule that specifies that the domain set of the dynamic object is required to share one or more common domains with the domain set of the second process, and a third rule that specifies a denial domain set that takes precedence over the first and second rules when the domain set of the second process includes a domain in the denial domain set.

2. The method of claim 1, wherein the dynamic object is an inter-process communication, a temporary file, or a directory.

3. The method of claim 2, wherein the inter-process communication includes a semaphore, a message queue, or a shared memory.

4. The method of claim 1, wherein a domain of the dynamic object is the same as a domain of the first process.

5. A computer program product for performing domain-based access control for granular isolation on a data processing system, the computer program product comprising:
    a computer-readable storage device having computer-readable program code embodied therewith, wherein the computer-readable program code, when executed by a data processing system, causes the data processing system to:
        assign one or more first domain tags to a dynamic object that is created by a first process that is executing on the data processing system;
        assign one or more second domain tags to a second process that is executing on the data processing system; and
        evaluate the first and second domain tags according to one or more enforced rules to determine whether to grant or deny the second process access to data associated with the dynamic object, wherein the one or more enforced rules include a first rule that specifies that a domain set of the dynamic object is required to be a subset of a domain set of the second process, a second rule that specifies that the domain set of the dynamic object is required to share one or more common domains with the domain set of the second process, and a third rule that specifies a denial domain set that takes precedence over the first and second rules when the domain set of the second process includes a domain in the denial domain set.

6. The computer program product of claim 5, wherein the dynamic object is an inter-process communication, a temporary file, or a directory.

7. The computer program product of claim 6, wherein the inter-process communication includes a semaphore, a message queue, or a shared memory.

8. The computer program product of claim 5, wherein a domain of the dynamic object is the same as a domain of the first process.

9. A data processing system, comprising:
    a memory; and
    a processor core coupled to the memory, wherein the processor core is configured to:
        assign one or more first domain tags to a dynamic object that is created by a first process that is executing on the data processing system;
        assign one or more second domain tags to a second process that is executing on the data processing system; and
        evaluate the first and second domain tags according to one or more enforced rules to determine whether to grant or deny the second process access to data associated with the dynamic object, wherein the one or more enforced rules include a first rule that specifies that a domain set of the dynamic object is required to be a subset of a domain set of the second process, a second rule that specifies that the domain set of the dynamic object is required to share one or more common domains with the domain set of the second process, and a third rule that specifies a denial domain set that takes precedence over the first and second rules when the domain set of the second process includes a domain in the denial domain set.

10. The data processing system of claim 9, wherein the dynamic object is an inter-process communication, a temporary file, or a directory.

11. The data processing system of claim 10, wherein the inter-process communication includes a semaphore, a message queue, or a shared memory.

* * * * *